US010176078B1

(12) United States Patent
Motel et al.

(10) Patent No.: US 10,176,078 B1
(45) Date of Patent: Jan. 8, 2019

(54) DEBUGGING PROCESS

(71) Applicant: Cadence Design Systems, Inc., San Jose, CA (US)

(72) Inventors: Vincent Motel, Grenoble (FR); Andrew Robert Wilmot, Carlisle, MA (US); Tal Tabakman, Tel-Aviv (IL); Yonatan Ashkenazi, Rehovot (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/838,709

(22) Filed: Aug. 28, 2015

(51) Int. Cl.
*G06F 11/34* (2006.01)
*G06F 11/36* (2006.01)
*G06F 8/70* (2018.01)

(52) U.S. Cl.
CPC ........ *G06F 11/3636* (2013.01); *G06F 11/348* (2013.01); *G06F 11/3447* (2013.01); *G06F 11/3471* (2013.01); *G06F 11/3652* (2013.01); *G06F 11/3664* (2013.01); *G06F 8/70* (2013.01)

(58) Field of Classification Search
CPC .................................................. G06F 11/3636
USPC ......................................................... 717/131
See application file for complete search history.

(56) References Cited

U.S. PATENT DOCUMENTS

| | | | | |
|---|---|---|---|---|
| 6,026,230 A * | 2/2000 | Lin | ...................... | G06F 17/5022 703/13 |
| 6,587,995 B1 * | 7/2003 | Duboc | .................. | G06F 11/261 703/16 |
| 6,678,645 B1 * | 1/2004 | Rajsuman | ........... | G06F 17/5022 703/14 |
| 7,072,820 B1 * | 7/2006 | Bailey | ................. | G06F 17/5022 703/13 |
| 7,216,336 B1 * | 5/2007 | Ezra | ..................... | G06F 11/3624 714/E11.207 |
| 8,578,340 B1 * | 11/2013 | Daudel | ............... | G06F 11/3636 710/266 |
| 8,732,199 B2 * | 5/2014 | Chen | .................... | G06F 11/3476 707/737 |
| 2002/0019969 A1 * | 2/2002 | Hellestrand | ........... | G06F 11/261 716/102 |
| 2005/0102572 A1 * | 5/2005 | Oberlaender | ....... | G06F 17/5022 714/29 |
| 2005/0102583 A1 * | 5/2005 | Spadari | ................. | G06F 11/261 714/45 |
| 2010/0042975 A1 * | 2/2010 | Schneider | ........... | G06F 11/3648 717/125 |
| 2016/0147517 A1 * | 5/2016 | Vicovan | ................... | G06F 8/53 717/140 |

* cited by examiner

*Primary Examiner* — Lewis A Bullock, Jr.
*Assistant Examiner* — Theodore E Hebert
(74) *Attorney, Agent, or Firm* — Mark H. Whittenberger, Esq.; Holland & Knight LLP

(57) ABSTRACT

The present disclosure relates to a system and method for capturing log messages in a post-processing debugging environment. Embodiments may include receiving a processor model associated with an electronic design and generating, using one or more processors and the processor model, a complete view of the state of the memory. Embodiments may further include writing, using one or more processors and the processor model, a log message whenever a designated message logging function is reached within the complete view of the state of the memory.

16 Claims, 9 Drawing Sheets

100

200

300

400

500

610

DEBUGGING PROCESS

FIELD OF THE INVENTION

Aspects of the present invention relate generally to the field of system development and test, and more specifically to event-driven simulation and emulation of electronics.

DISCUSSION OF THE RELATED ART

Simulation of hardware components can be modeled at various levels of abstraction using event-driven simulation. Processor models in combination with hardware simulators can be used to simulate cross-compiled embedded software, for example, an operating system (OS). A collection of hardware models running such embedded software is known as a simulation platform. A simulation platform may also include models of peripherals such as memory modules, the system bus, universal asynchronous receivers (UARTs), terminals, USB devices, etc.

When the simulation platform includes processor models, it is also possible for the event-driven simulation or emulation environment to simulate the behavior of the actual cross-compiled embedded software (ESW) running on the processor models within the system. However, issues often exist with incorrect or unexpected interactions between the hardware and embedded software elements of the simulation system. To debug and analyze such problems, it is useful to record the state of the various hardware elements of the simulation platform at each discrete event or time during a simulation or emulation session to evaluate at a later date.

Processor models typically support the generation of execution traces that track the execution of instructions, register and memory accesses. The simulation platform may also allow the tracing of bus transactions, physical memory accesses and peripheral register values. These execution traces are conventionally created at run-time and can be written to a text file, database, or other log file. Such systems often contain tables mapping the physical addresses and peripheral registers such as a memory map or text file.

As previously noted, when creating debugging and analysis tools for the simulation platform, it is advantageous to have a complete knowledge of the values of system memory. Debuggers use many methods for memory value inspection if they are operating at run-time. However, for debuggers that are used after the simulation or emulation has ended (post-process debuggers), several problems arise. For example, since the simulation and debug session has been terminated, APIs that access memory values at run-time cannot be used.

Additionally, it is not possible to know in advance what memory value(s) a user might want to inspect during a post-processing debug session. Therefore it is useful to know memory values at all time points during the execution of the simulation and debug session. However, a brute force solution that stops the simulation or emulation at each tick of time and dumps the entire state of the memory is inefficient and storage intensive, and might not even work if no API exists for requesting memory values without creating new system side effects.

SUMMARY OF INVENTION

In one or more embodiments of the present disclosure, a computer-implemented method for capturing log messages in a post-processing debugging environment. The method may include receiving a processor model associated with an electronic design and generating, using one or more processors and the processor model, a complete view of the state of the memory. The method may further include writing, using one or more processors and the processor model, a log message whenever a designated message logging function is reached within the complete view of the state of the memory.

One or more of the following features may be included. In some embodiments, writing may include retrieving at least one parameter of the designated message logging function, determining a caller of the log message, recording message information at a source file location, and presenting the message information in a user interface of the post-processing debug environment. The designated logging function may be an empty logging function. The designated logging function may be written as a pseudo-comment associated with source code. The method may further include setting a breakpoint in the designated message logging function within the complete view of the state of the memory, wherein retrieving at least one parameter of the designated message logging function occurs when a breakpoint in a designated logging function is reached. The complete view of the state of memory may be generated at each time point contained in a hardware state database. In some embodiments, retrieving the at least one parameter of the designated message logging function may be based on an indication from a function call signature. The message information may be recorded at a source file location includes one or more of the at least one parameter of the designated message logging function and the caller of the log message. In some embodiments, writing a log message may include yielding control of the processor model to the debugging environment.

In some embodiments, a computer-readable storage medium for electronic design simulation is provided. The computer-readable storage medium may have stored thereon instructions that when executed by a machine result in one or more operations for capturing log messages in a post-processing debugging environment. Operations may include receiving a processor model associated with an electronic design and generating, using one or more processors and the processor model, a complete view of the state of the memory. Operations may further include writing, using one or more processors and the processor model, a log message whenever a designated message logging function is reached within the complete view of the state of the memory.

One or more of the following features may be included. In some embodiments, writing may include retrieving at least one parameter of the designated message logging function, determining a caller of the log message, recording message information at a source file location, and presenting the message information in a user interface of the post-processing debug environment. The designated logging function may be an empty logging function. The designated logging function may be written as a pseudo-comment associated with source code. Operations may further include setting a breakpoint in the designated message logging function within the complete view of the state of the memory, wherein retrieving at least one parameter of the designated message logging function occurs when a breakpoint in a designated logging function is reached. The complete view of the state of memory may be generated at each time point contained in a hardware state database. In some embodiments, retrieving the at least one parameter of the designated message logging function may be based on an indication from a function call signature. The message information may be recorded at a source file location includes one or more of the at least one parameter of the designated message logging function and the caller of the log message. In some embodiments, writing a log message may include yielding control of the processor model to the debugging environment.

In one or more embodiments of the present disclosure, a system for capturing log messages in a post-processing debugging environment is provided. The system may include at least one processor configured to receive a processor model associated with an electronic design. The at least one processor may be further configured to generate, based upon, at least in part, the processor model, a complete view of the state of the memory. The one or more processors may be further configured to write a log message whenever a designated message logging function is reached within the complete view of the state of the memory.

One or more of the following features may be included. In some embodiments, the at least one processor may be further configured to retrieve at least one parameter of the designated message logging function, determine a caller of the log message, record message information at a source file location, and present the message information in a user interface of the post-processing debug environment.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

According to an embodiment, a system and method are provided for constructing an accurate view of system memory over time that works without any special API from the memory model for inspecting memory values. The system memory view can be used with post-processing debug and analysis tools, but could also be employed in a real-time debugger.

The system memory view is constructed by capturing each memory execution transaction, bus transaction, and register transaction during simulation. Each captured transaction is expressed as a message that may be parsed and stored in a memory database. Changes in hardware state may also be captured and stored in a hardware state database. Switches between processes detected during the simulation may cause an update to a simulated register or memory location that will be captured as a change in hardware state and stored in a hardware database. Such process switches may occur when a breakpoint or watchpoint is detected or otherwise inserted or during a transition from a software to a hardware domain during the simulation.

Aspects of the present invention describe a system and method for providing an interface to observe the results of a simulation or emulation of a system having multiple disparate software and hardware components, including embedded software, in a post-processing debug and analysis tool. Aspects of the present disclosure further include a method for minimally intrusive log messages from embedded software in a post-processing debugging environment and a method to retrieve minimally intrusive log messages from embedded software through an interactive debug connection.

The system memory view is created by monitoring data traces. The three basic kinds of data traces captured to create the system memory view include processor execution traces, bus transaction traces, and peripheral register traces.

An execution trace alone will rarely be enough to create an accurate representation of memory, because, for example a peripheral model (e.g. a DMA controller) can read or write directly from or to memory or a memory-mapped peripheral model with memory-mapped registers can respond to a transaction that changes its register values. However, since each memory event generates (or can be inferred from) related bus transactions or register changes, monitoring bus traces and peripheral registers in conjunction with the execution traces will allow construction of an accurate and complete representation of memory.

Figure 1:
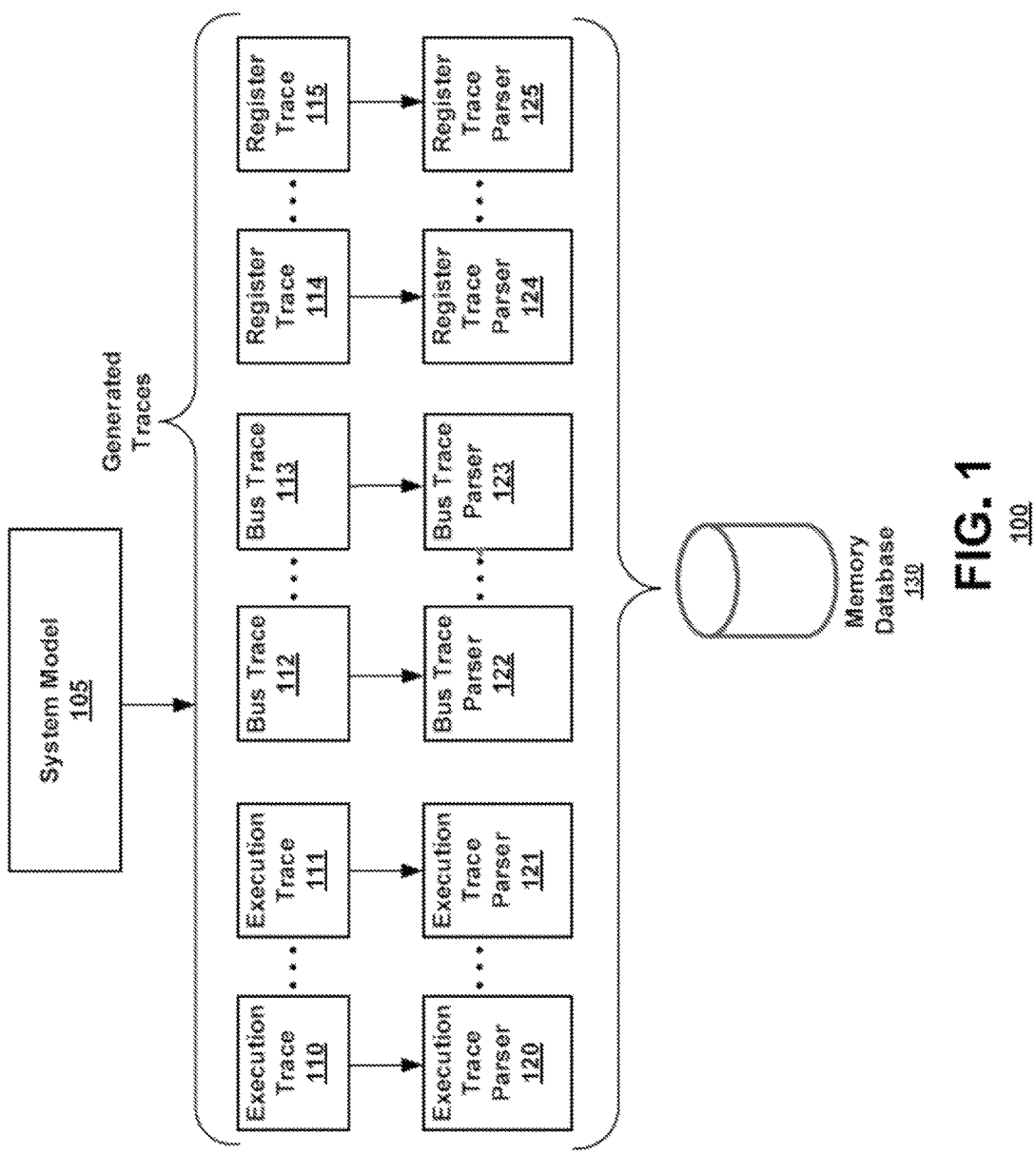
FIG. 1 is a block diagram illustrating components of an exemplary system according to an embodiment of the present invention.

FIG. 1 is a simplified block diagram illustrating components of an exemplary system 100 according to an embodiment. As shown in FIG. 1, a system model 105 will produce multiple traces 110-115 during simulation or emulation of the system model 105. The traces will then be captured for later use, for example, with a debugger.

According to an embodiment, the traces could be instantiated in the form of a single file, multiple files, or the trace data could arrive in groups of messages, in a database, etc. The individual traces could even be combined into a single information stream or file.

Then, from the captured traces, a trace event can be extracted. For example, events that occur either at a specific simulation time (e.g., at time 2 ns after simulation or execution start) or that occur in a specific execution sequence (e.g., the event was the 1014th that occurred after simulation or execution commenced) can be identified.

An exemplary execution trace message may include the following information: the device or element that executed the traced action (e.g., Processor X), the action that occurred (e.g., read/write), a length or number of words or lines affected (e.g., 1 word of memory), the value of the word or line (e.g., 0x01), the address that was accessed (e.g., 0x1111212), and the time the event occurred (e.g., 2 ns). The form and contents of the trace message may vary, but should provide sufficient information to extract event information in order to create a complete and accurate view of the system memory over time.

Bus transaction traces can have many formats. For example, the format of a bus trace can vary depending on the standard and system producing the trace, (e.g. the TLM 2.0 standard, ARM Tarmac Memory Bus Trace, etc.). However, a bus trace should include the following information: the initiator or master device that generated the bus transaction, the target or slave device that provides the information requested by the bus transaction, a mode such as read, write, read/write, etc., a time when the transaction occurred, the length of bytes that were requested, the address of the data that was written or read, and the data that was read or written. An exemplary bus trace message (simplified and expressed in human readable form) could be "Device dev1 reads 4 bytes of memory receiving value 0x20 from address 0x122211 of target device memory1 at time 23 ns". The form and contents of the trace message may vary, but should provide sufficient information to extract event information to contribute to a complete and accurate view of the system memory over time.

Similarly, a register trace message may include the device that interacted with the register (e.g., device dev1), the register that was affected (e.g., register R0), the value the register was changed to (e.g., 0x0), and the time the event occurred (e.g., 2 ns). The form and contents of the trace message may vary, but should provide sufficient information to extract event information to contribute to a complete and accurate view of the system memory over time.

For each source of execution, bus, or register transaction, there is a corresponding parser 120-125, that is able to parse out the trace messages to generate information about the specific values of data that resides in memory at a point in time. The parser may also understand register value changes and can build a memory map to map registers to addresses in memory. Hence when a register R0 changes to value 0x0, the parser would know that this implies memory address 0x100000 took the value 0x0 if R0 is mapped to address 0x100000.

When an execution trace parser parses out a message that either shows a memory value that it retrieved by reading from a memory or by writing a value to memory the parser commits the trace to the database 130. When a bus transaction trace parser parses out a bus transaction, it first determines whether the target device of the bus transaction is a memory being tracked in the database 130. If it is, the value that was either written or read is committed to the database 130. Bus transactions for target devices not being tracked may be ignored.

When a peripheral register trace parser parses out a register value change, it first uses a memory map to find out which address in physical memory should be updated when the register changes value. Then the value that was either written or read is committed to the database 130 using the address determined from the memory map.

A memory device such as a database 130 stores a representation of the system memory as a function of time. The database supports read and write operations. For example, an exemplary readMemory command may have the following inputs: a base address in memory, a length, and a time value. The readMemory command will then return the data from memory that was present at that time. The time value may represent simulation time, execution time, sequence, etc. The readMemory command will return either a value that was recorded from the received traces or zero if no trace operation involving the given memory address was discovered during trace parsing. An exemplary writeMemory command will include a base address, a length, a time value, and a data value that will be written to the database. According to an embodiment, the database 130 is a temporal database. Consequently, if no trace event occurred at the precise moment of time requested by the input time value, the database 130 will retrieve the value that was last set by reviewing earlier moments in time to identify the last event that affected that memory (if there was one). According to an embodiment, the database 130 could be implemented as a temporal sparse matrix or a three dimensional matrix.

According to an embodiment, an origination time is the first time when a complete physical memory dump is processed and stored in the memory database 130. This may be a logical time that relates to the time or sequence details of the simulation or execution session and may be some time after the simulation has begun (e.g., at a time greater than time 0). Any read operation that asks for a value at a time before the origination time will result in an error or a response that the value is not known.

According to an embodiment, the origination time may be set to time 0, e.g., when simulation or execution begins. Then all memory values will be presumed to be either 0 or undefined. For simplicity, and to avoid errors, all memory values may be considered to be in the "0" state at this origination time. According to an embodiment at origination time=time 0, the system may be preloaded with values in the database. For example, the initial values may be read from a file such as an Executable and Linkable Format (ELF) or Debugging With Attributed Record Formats (DWARF) compiler created file.

It is possible that multiple trace statements could contain trace messages that represent information about a memory at the same (or very time proximate) instance. For example, a value being read from a register and written to system memory will produce multiple traces. However, all such transactions can safely be written to memory because the trace information provides insight into the state of memory either via a read/write operation. In a properly functioning model or simulation, the values will be the same. According to an embodiment, conflicts of memory captured at substantially the same time may be identified, which could indicate that the model has a bug and give guidance for how to find the bug and correct the problem.

Once a complete and accurate view of system memory over the course of the simulation or emulation is captured, a debug or analysis environment can access the database 130 to read values, for example using a readMemory function, as needed to support desired operations that require knowledge of memory at given points in time.

Capturing trace information and using such information during interactive simulation and debugging is described in further detail in co-pending application, entitled "A Method for Interactive Embedded Software Debugging Through the Control of Simulation Tracing Components," filed concurrently with this application, the disclosures of which is incorporated herein by reference in its entirety.

Figure 2:
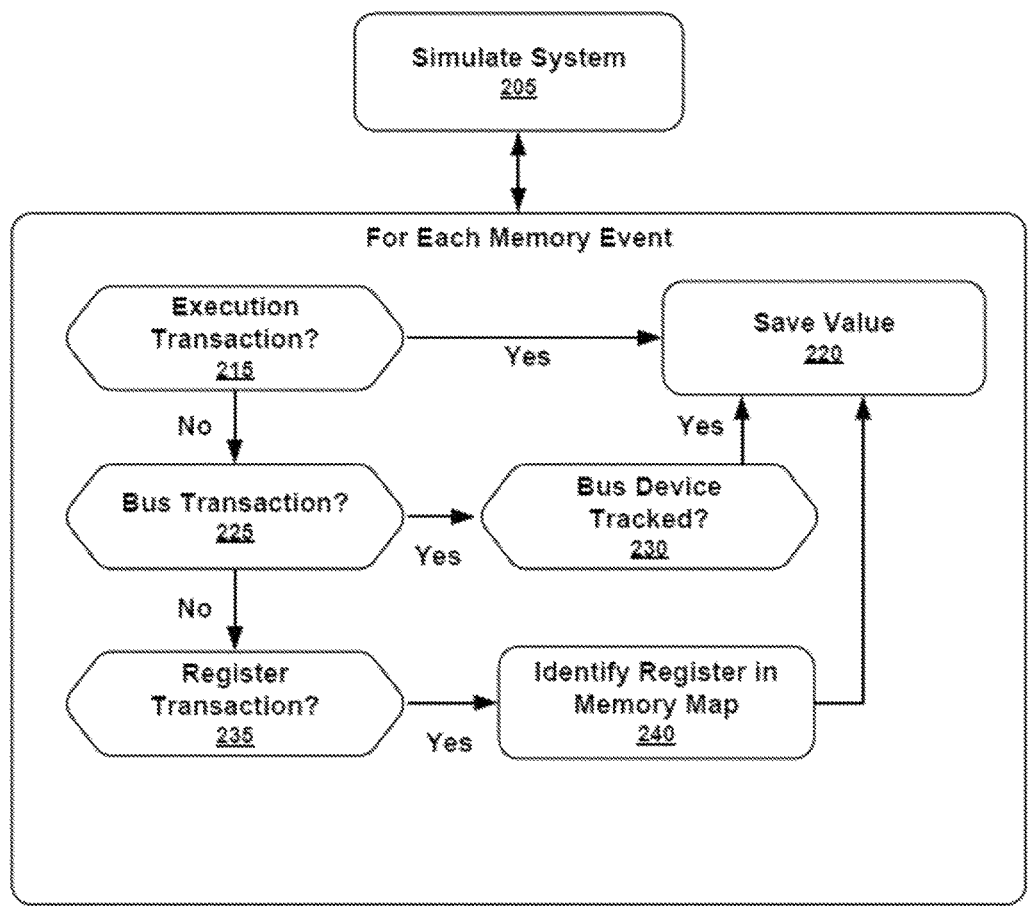
FIG. 2 illustrates an exemplary method for simulating hardware and software components implemented on a simulation platform according to an embodiment of the present invention.

FIG. 2 illustrates an exemplary method according to an embodiment. As shown in FIG. 2, initially a simulation or emulation of a system is initiated (block 205). Then, for each memory event or transaction detected, the trace of the transaction will be parsed. If the memory event is a read/write execution transaction for the system memory (block 215), then the value that was read or written to the memory is written to the memory database (block 220).

If the memory event is a bus transaction (block 225), if the transactions related to the target device of the bus transaction are being tracked (block 230), then the value transmitted on the bus is written to the memory database (block 220). However, if the target device is not being tracked (block 230), then nothing is written to the memory database.

If the memory event is a register transaction (block 235), then the register will be identified in a memory map to identify the address of values associated with the register in the memory database (block 240). If the register was not previously mapped, a new entry in the memory database will be created and the map updated to identify the new entry associated with the register (not shown). Once the register is identified in the memory map, the value stored to or read from the register is saved to the memory database (block 220).

After each memory event is processed, the simulation will continue until the next memory event is detected or the simulation completes. Once the simulation is complete, and there are no more memory events associated with the simulation, the simulation will exit, leaving an accurate copy of the memory at any given time of the simulation.

Figure 3:
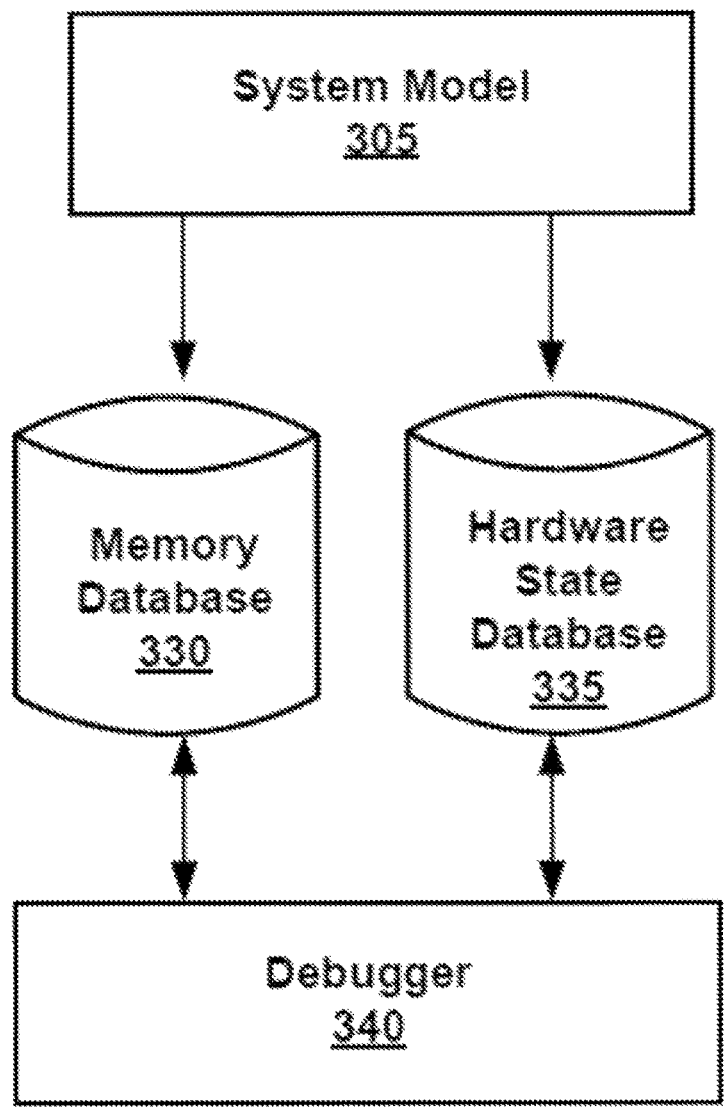
FIG. 3 is a block diagram illustrating components of an exemplary system according to an embodiment.

FIG. 3 is a simplified block diagram illustrating components of an exemplary system according to an embodiment. In FIG. 3, similarly to FIG. 1 above, a system model 305 will produce multiple traces during simulation or emulation of the system model 305. The traces will then be captured and stored for later use in a memory database 330. Additionally, the state of all simulator processor registers will be stored in a hardware state database 335. The combination of the data stored in the memory database 330, the hardware state database 335, and symbolic software debugging information (e.g. Executable and Linkable Format (ELF) and Debugging With Attributed Record Formats (DWARF) compiler created files) will provide an accurate representation of the software state at any time during the simulation. This representation of the software state can later be accessed for example, with a post-processing debugger 340. The post-processing debugger can also access the state of hardware or memory at any point of the recorded simulation and compare the hardware and memory state to identify discrepancies. Therefore the debugger can be used to access information for the entire simulation platform including the software of the OS and the processes and threads of the platform, as well as the traces saved in the memory database.

According to an embodiment, a representation of embedded OS data structures and entry points will be used with the memory database 330 and hardware database 335 to implement post-processing debug and analysis capabilities for software processes and threads that were executed on the OS during simulation or emulation.

For example, a Program Counter (PC) register value that represents the location of a function in the embedded OS software that switches between processes can be searched forward or backward in the hardware state database. Similarly to the capture of the memory image in the memory database 330, this information may be captured and stored in the hardware database 335. The PC register will be monitored during simulation of the system model 305 and when a register event, transaction, or other change is detected, and trace will be transmitted to a register parser (not shown). The parser will parse the register trace and store the relevant information in the hardware state database 335. The capture of the PC register will capture the execution flow of bare-metal software and applications programs at an instruction level.

During post-process debug or other post-processing operations, when the desired PC value is found at a particular time point, then the values of memory from the memory database 330 and processor registers from the hardware state database 335 corresponding to that time point can be retrieved to reconstruct the values in OS process tables and other data structures at that particular time point. This information allows the addresses associated with arbitrary source functions or source lines in the OS process or thread that was scheduled to start at that time point to be calculated (again with the help of the symbolic software debugging information associated with the process or image running on the OS). This PC address can then be searched through in the hardware state database 335 to follow the particular line or function until a different PC value is encountered. An analogous algorithm can be devised for examining symbolic variable values in an arbitrary OS process or thread which has associated symbolic software debugging data. Similarly, values of important CPU registers can be recorded.

The insertion or creation of complex breakpoint conditions within a simulation platform is described in further detail in co-pending U.S. patent application Ser. Nos. 13/907,516, 13/907,474, and 13/907,566, the disclosures of which are incorporated herein by reference in their entirety.

Once the simulation has completed, and the memory and hardware databases have been populated, the captured information may be stepped through during post-processing operations. For example, a user may identify a new complex breakpoint condition according to a specified value of a variable. Then the post processing debugger will search or step through the known values of the variable as stored in the memory or hardware database in order to identify the breakpoint. This search can be performed forward or backward in time within the simulation time captured by the databases.

According to an embodiment, identifiers are constructed which unambiguously designate a particular state or element associated with a particular instance of a modeled hardware component or a particular instance, element or object of a modeled software component in the context of the entire captured simulation. Implementing global identifiers for each instance of a modeled element allows such identifiers to appear in condition expressions and action statements in the post-processing control interface and defines mechanisms for the control interface to query the memory database and the hardware state database as appropriate. Unique and unambiguous identifiers are further described in the aforementioned co-pending U.S. Patent Applications.

According to an embodiment of the present invention, to facilitate stepping through the source code of the modeled components with the post process debugger, breakpoints may be inserted as described above. During simulation, execution control may transition between the embedded software and the simulation control thread. When an operation crosses the software and hardware domains so that either the next software or hardware source code line, as appropriate, will be executed, the transition will be recorded, for example in the PC register. A user can then step through the actions performed and captured during simulation. For example, the debugger may cross the software and hardware domains so that either the next software or hardware source code line, as appropriate, will be shown to have been executed next to the user of the debugger. The user can then step through the executed lines in order from any identified point in the captured simulation. Additionally, the user will be able to step backward in time within the captured simulation.

Stepping between domains during simulation is further described in the aforementioned co-pending U.S. Patent Applications.

Figure 4:
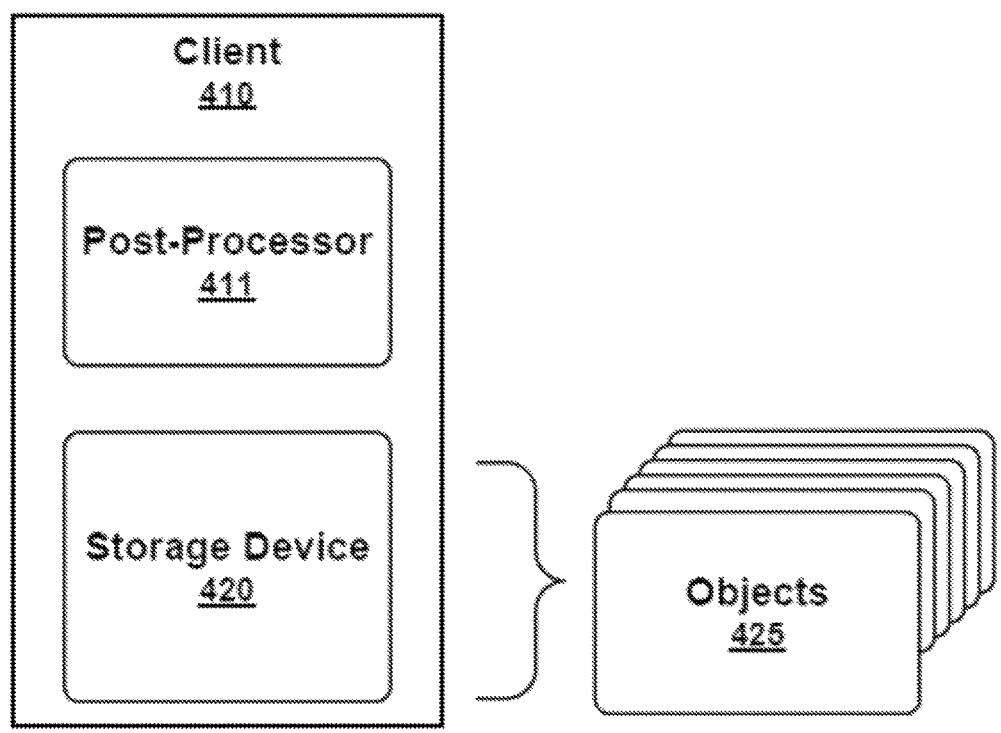
FIG. 4 is a block diagram illustrating components of an exemplary system according to an embodiment.

A user may access a post-processing interface in a stand-alone client system, client-server environment, or a networked environment. FIG. 4 is a simple block diagram illustrating components of an exemplary system 400 according to an embodiment. As shown in FIG. 4, a system 400 may comprise a client 410 executing a post-processor 411 and having a memory storage 420. The client 410 may be any computing system that executes a post-processor 411 or otherwise facilitates access to memory storage 420, for example a personal computer. The client 410 may include a processor that performs a method in accordance with the disclosed embodiments. Such a client would be part of an overall simulation system in accordance with the disclosed embodiments.

Hardware models, instruction sets, software packages, the hardware state database, the memory database, and other objects 425 used by the simulation system may be stored in memory storage 420. A user may access the objects 425 stored in memory storage 420 with the client 410 via a post-processing interface, where the post-processing interface is capable of accessing memory storage 420 and displaying the objects 425 and the data associated with the simulation. The post-processing interface may include a user interface, for example a program, application or middleware that acts as a frontend to and facilitates access to objects in memory storage 420. The post-processing interface may facilitate observability into the captured simulation of the modeled components using the display and edit tools and procedures described herein. The user may interact with the post-processing interface through a number of input devices, such as by inputting a selection as with a mouse or inputting a request as with a keyboard. The user may observe the simulation results on an output device or display. The post-processing interface may run in an application window controlled by the user.

As shown in FIG. 4, a client 410 may be a stand-alone system, as may be of particular interest where the components simulated are highly confidential. Additionally, according to an aspect of an embodiment as shown in FIG. 5, a client 510 may be part of a networked environment.

Figure 5:
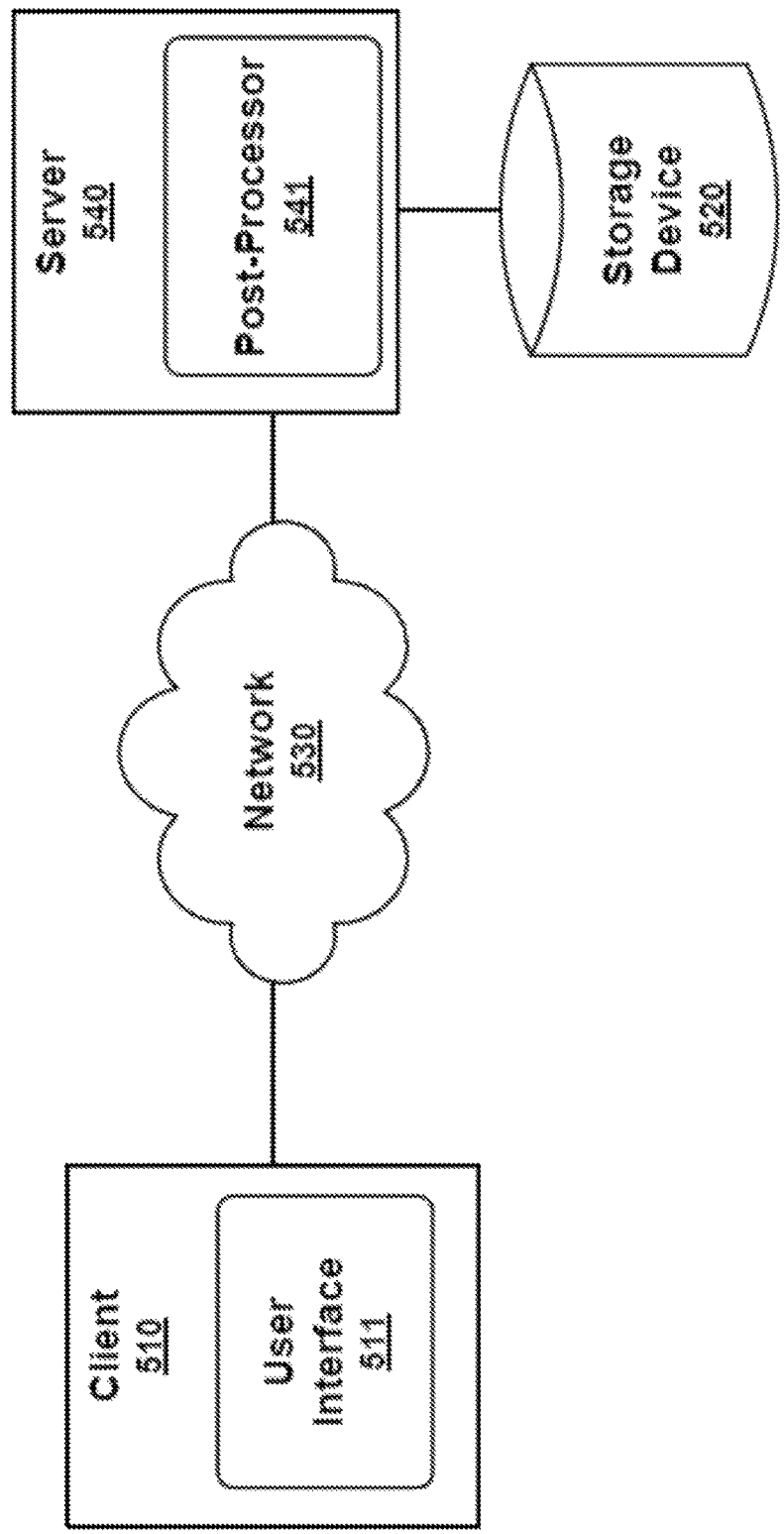
FIG. 5 is a block diagram illustrating components of an exemplary system according to an embodiment.

FIG. 5 is a simple block diagram illustrating components of an exemplary system 500 according to an embodiment. As shown in FIG. 5, system 500 may include a client 510 having a user interface 511. The client 510 may be connected to a server 540 via a network 530. The post-processor 541, which in this embodiment is located at server 540, may have access to storage device 520 storing hardware models, instruction sets, software packages, a hardware state database, a memory database, and other objects utilized by the simulation system. The server 540 may include a processor that performs a method in accordance with the disclosed embodiments. Such a server then would be part of the overall simulation system in accordance with the disclosed embodiments.

A user may access a post-processor 541 at the server 540 via the client 510 having a user interface 511 capable of accessing and displaying the information captured during simulation. The client 510 may be any computing system that facilitates the user accessing storage device 520, for example a personal computer. The network 530 may be a wired or wireless network that may include a local area network (LAN), a wireless area network (WAN), the Internet, or any other network available for accessing storage device 520 from the client 510.

The server 540 may be a network server accessible to the client 510 via the network 530 that may manage access to storage device 520. The user interface 511 may receive instructions regarding analyzing a simulation from the user and utilizing the objects stored in memory storage 520, facilitate a display of the simulation results queried from the described databases. Multiple different clients (not shown) may access storage device 520 via the network 530 and request access to the objects stored therein.

In another networked environment, the post-processor may be executed on a network capable client and access the other objects stored in one or more storage devices via a network and communications server.

Figure 6:
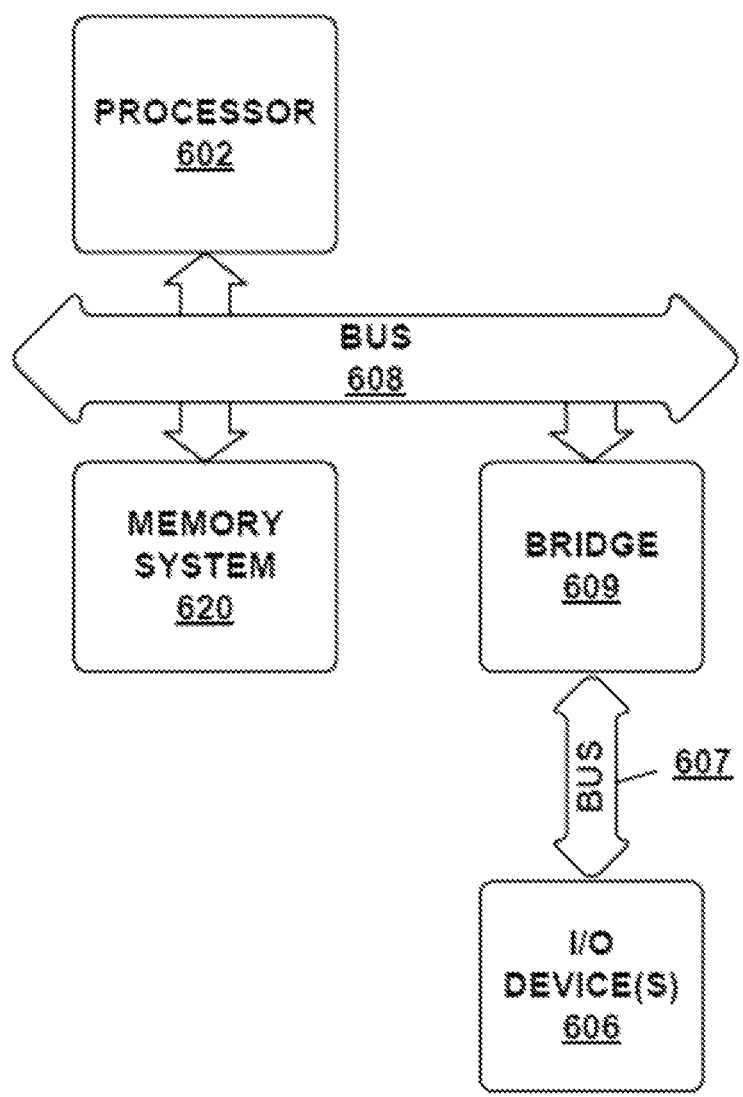
FIG. 6 is a block diagram illustrating components of an exemplary client according to an embodiment of the present invention.

FIG. 6 is a simple block diagram illustrating components of an exemplary client 610 according to an embodiment of the present invention. As shown in FIG. 6, the client 610 configured to execute the post-processor as described herein may include a processor 602, a memory system 620 and one or more input/output (I/O) devices 606 in communication. The communication can be implemented in a variety of ways and may include one or more computer buses 607, 608 and/or bridge devices 609 as shown in FIG. 6. The I/O devices 606 can include network adapters and/or mass storage devices from which the client 610 can receive commands for executing the simulation.

In some applications, the modules described herein may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIG. 3 do not necessarily imply a particular order or sequence of events, nor are they intended to exclude other possibilities. For example, the operations depicted at blocks 315, 325, and 335 may occur in any order or substantially simultaneously with each other. Such implementation details are immaterial to the operation of the present invention unless otherwise noted herein.

Embodiments of the present disclosure may also include a method for retrieving minimally intrusive log messages from embedded software in a post-processing debugging environment. As discussed above, event-driven simulation and emulation environments allow the simulation or emulation of electronics hardware elements modeled at various levels of abstraction. When processor models are available, it is also possible for the event-driven simulation or emulation environment to simulate the behavior of the actual cross-compiled embedded software running on processor models within the system.

A common problem when developing an ESW platform (and the corresponding actual systems which they model) are issues with incorrect or unexpected interactions between the hardware and embedded software elements of the system. To debug and analyze such problems, it may be useful for an engineer to be able to record into a database (e.g., database 130 shown in FIG. 1) the state of the various hardware elements of the ESW platform at each discrete event or time point in a simulation or emulation session and then afterwards, in a post-processing debugging environment, reconstruct at a particular time point or set of time points a coherent view of the state of all of the various hardware and software elements of the ESW platform to help identify unexpected behavior.

Further, embedded software may also be instrumented with debugging and/or log messages. These log messages may contain attributes such as severity and verbosity tags which allow for filtering of these messages. During live simulation or emulation, these log messages may be typically output to simulated I/O devices (e.g., terminals connected to UARTs), dedicated memory regions or through techniques like semi-hosting. Each of these are discussed in further detail below. The latter technique often involves use of processor features that may not be used in the actual device, while the former techniques can significantly change the behavior of the overall system because of the additional hardware interactions. It may be valuable when debugging ESW platforms to see such log messages correlated with the other hardware and software state in a post-processing debugging environment, while minimizing the behavior impact of the production of these messages on the overall system being simulated or emulated.

Embodiments included herein may apply the concepts described above (e.g., constructing a sound and complete model of system memory with no processor cache considerations using execution, bus transaction, and peripheral register traces) to the problem of constructing a minimally intrusive method for capturing log messages from ESW in a post-processing debugging environment.

As discussed above, a sound and complete view of the state of the memory from the processor's point of view may be available at each time point from a post-processing Memory Database 130, 330. When combined with the state of all the processor registers at each time point which is contained in Hardware State Database 335 and symbolic software debugging information from standard formats such as ELF and DWARF, then the complete software state, in terms corresponding to a high-level programming language such as C, can be known at any time point.

Accordingly, this software state may then be used to re-construct the parameter values of any function call executed within the ESW. In particular, the ESW source code may be instrumented to call a specially designated function name (or set of function names) which may represent calls to a logging function compiled into the embedded software image executed by the processor models.

For example, the designated logging function might have a C language signature "log_to_debug_environment (int severity, int verbosity, char *message, char *tag)", where severity represents the severity of the message, verbosity allows filtering of the messages, tag associates the message with a functional or behavioral category, and the "message" represents the actual message to be logged. The debug environment can read through the databases described above and then recognize each such function call (and the corresponding parameter values of the function call) to this designated function in the ESW and present these as logging messages in the user interface of the debugger to assist in debugging the behavior of the ESW and the overall system. The function itself may be completely empty (that is, with no implementation) when it is run as part of the ESW—it just needs to exist (not be optimized away by the compiler) and be called for this approach to work. Further, note that logging functions may have additional input parameters for the file name and line number of the caller and these parameters may be present and correspondingly re-constructed. However, this information may be calculated also from the databases and need not be included in the ESW execution—further limiting the execution overhead of the logging function call in the ESW.

Embodiments of the present disclosure may be configured to instrument the ESW with such function calls (or the equivalent information), but within "pseudo-comments" which may not affect the software image produced after compilation of the ESW. A parser or pre-processor may then calculate the file and line information at which these pseudo-comments appear. Then, when execution of this line would have occurred (as determined through knowledge of the complete software state at any time point as described above), the method described above to construct the logging message by evaluating the expressions which represent the parameter values of the logging function can be performed. In this second embodiment, the log messages may be generated as part of the post-processing debug environment at (pre-)instrumented points in the software execution, may also be maintained as part of the ESW source code and may not impact the behavior of the executed program or its interaction with the ESW platform. However, the parameter expressions relating to the logging message may not be fully checked for correctness until the debug environment attempts to construct the log message (after program execution on the ESW platform).

Figure 7:
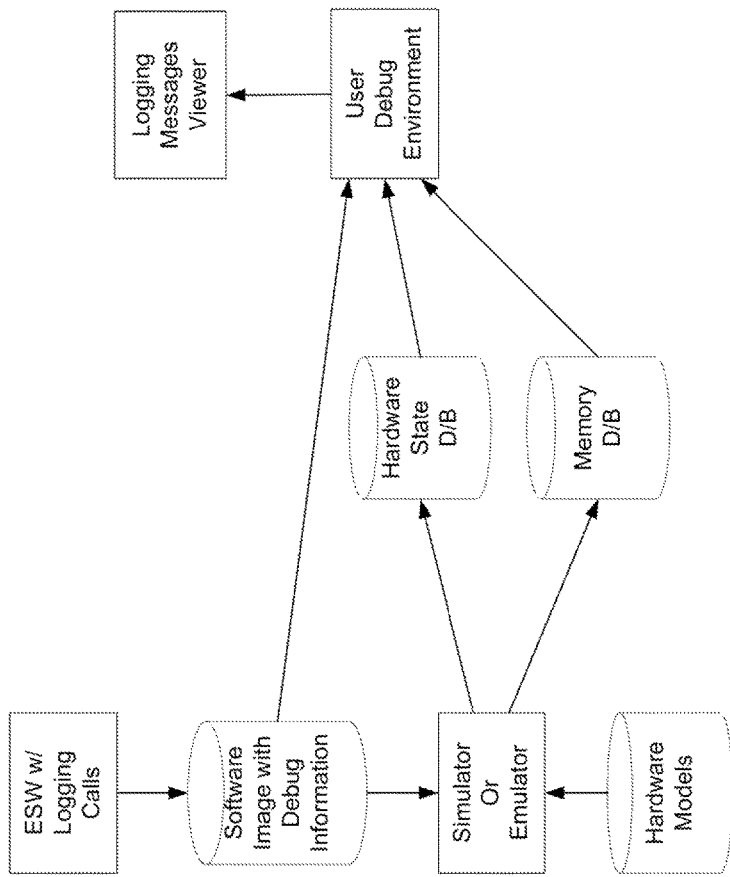
FIG. 7 is a block diagram illustrating components of an exemplary system according to an embodiment.

Referring now to FIG. 7, a flowchart 700 depicting one embodiment consistent with the teachings of the present disclosure is provided. This approach is minimally intrusive to the behavior of the system in the following ways: It does not require the specialized programming of hardware in the system (e.g. UARTs) which might otherwise affect the behavior of the system. It also does not require any dedicated memory or specialized CPU behavior for semi-hosting techniques. Some embodiments may require the (simulated) execution of additional ESW and temporary consumption of memory on the stack for holding the parameters during each instrumented function call.

As described above, logging messages may be communicated to debugging environments through the techniques of:

UARTs connected to terminals or other specially system hardware (This approach can often alter the behavior of a system in significant ways—particularly if the UART is being otherwise used in the system. The timing of messages in a terminal connected to the UART is also often not well-correlated with the time at which the software generated the programming of the message on the UART. The techniques described herein do not rely on any specialized hardware to be present).

Dedicated memory locations (This approach requires that some memory be set aside and reserved for the dedicated purpose of message logging in the system, which may be unnatural and wasteful within the context of the overall system.

Semi-hosting (This approach generally requires that the processor behavior change to process the output which is to be semi-hosted, which is often undesirable in the ultimate system being modeled. It can also unnecessarily "bloat" the size of the ESW with the semi-hosting library itself.

Embodiments of the present disclosure may also include a method for retrieving minimally intrusive log messages from embedded software through an interactive debug connection. Event-driven simulation environments allow the simulation of electronics hardware elements modeled at various levels of abstraction. When integrated with processor models implementing Instruction Set Simulators (ISS), it may also be possible for the event-driven simulation environment to simulate the behavior of the actual cross-compiled embedded software running on processor models within the system. Such a collection of hardware models capable of running collections of embedded software is referred to herein as a Virtual Platform (VP).

A common problem when developing VPs (and the corresponding actual systems which they model) are issues with incorrect or unexpected interactions between the hardware and embedded software elements of the system. To debug and analyze such problems, an engineer must be able to control and observe the state of the various hardware and software elements of a VP.

Further, embedded software may also be instrumented with debugging and/or log messages. These log messages may contain attributes such as severity and verbosity tags which allow filtering of these messages. During the simulation, these log messages may be typically output to simulated I/O devices (e.g., terminals connected to UARTs), dedicated memory regions or through techniques like semi-hosting. The latter technique often involves use of processor features that may not be used in the actual device, while the former techniques can significantly change the behavior of the overall system because of the additional hardware interactions. It is valuable when debugging virtual platforms to see such log messages correlated with the other hardware and software state in a post-processing debugging environment, while minimizing the behavior impact of the production of these messages on the overall system being simulated or emulated.

Embodiments disclosed herein include minimally intrusive methods for capturing log messages from the embedded software. If the detailed execution of the processor model cannot be easily recorded (typically if the amount of executed software is very large), the dynamic debug connection to the processor model may be used to retrieve the messages.

In some embodiments, a breakpoint may be set on a designated message logging function (or set of functions), through the debug interface of the processor model. The breakpoint may be setup at any suitable time, including but not limited to, before the simulation starts, at a later point in the simulation from which the messages need to be retrieved, etc.

During the execution, each time the message logging function is reached, the processor model may yield control to the debugging environment, which may perform some or all of the following steps automatically:

Retrieve the parameters of the message logging function, by examining the current stack frame, using the symbolic software debugging information from the software image (in a standard format such as ELF and DWARF) to find out the relative addresses of the parameters.

Find out the caller of the message logging function, by examining the upper frame in the stack. The knowledge of the calling address (or return address) allows to make the relationship with the context of the message (source file and line).

Continue the simulation, by issuing a command to the processor model.

In some embodiments, the messages, with their parameters and context, may be recorded, and presented as logging messages in the UI of the debugger to assist in debugging the behavior of the embedded software and the overall system. This method may be transparent to the user because the debug environment may not stop nor pause the simulation when that breakpoint is reached, the user may still be able to use other breakpoints which do pause the simulation when reached.

For example, the designated logging function might have a C language signature "log_to_debug_environment (int severity, int verbosity, char *message, char *tag)", where severity represents the severity of the message, verbosity allows filtering of the messages, tag associates the message with a functional or behavioral category, and the "message" represents the actual message to be logged. The debug environment may set a breakpoint on that function, and at execution, each time it is reached, retrieve the severity, verbosity, message and tag parameters. The calling function and the offset in that function are retrieved too.

In some embodiments, the logging function itself may be completely empty (i.e., with no implementation) when it is run as part of the embedded software. It just needs to exist (not be optimized away by the compiler) and be called for this approach to work. Further, note that logging functions may include additional input parameters for the file name and line number of the caller and these parameters may be present and directly retrieved in the stack, but this information may be calculated also from the examination of the upper stack frame, further limiting the execution overhead of the logging function call in the embedded software.

Figure 8:
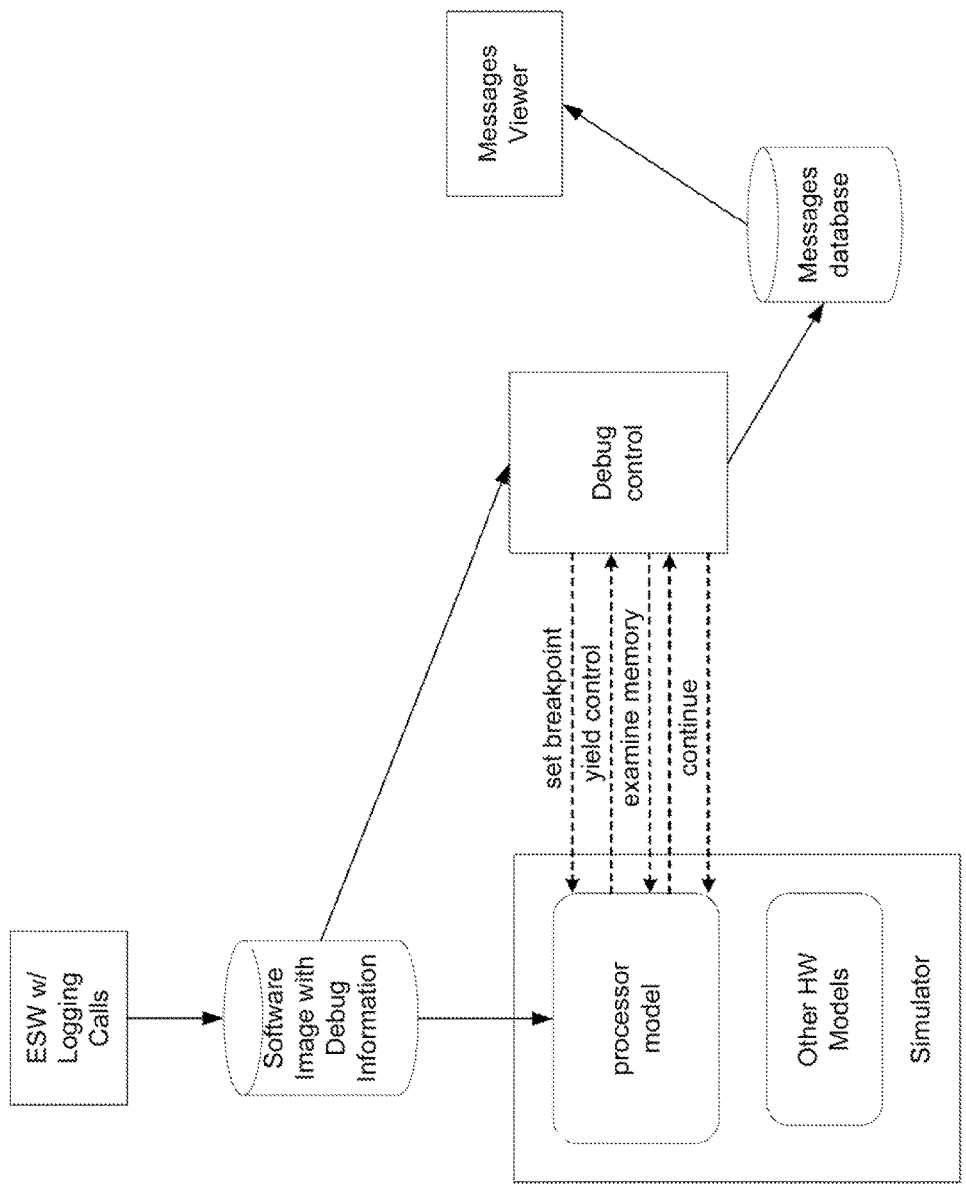
FIG. 8 is a block diagram illustrating components of an exemplary system according to an embodiment.

Referring now to FIG. 8, a flowchart 800 depicting one embodiment consistent with the teachings of the present disclosure is provided. This approach is minimally intrusive to the behavior of the system in the following ways: It does not require the specialized programming of hardware in the system (e.g. UARTs) which might otherwise affect the behavior of the system. It also does not require any dedicated memory or specialized CPU behavior for semi-hosting techniques. It does, however, require the (simulated) execution of additional embedded software and temporary consumption of memory on the stack for holding the parameters during each instrumented function call.

Figure 9:
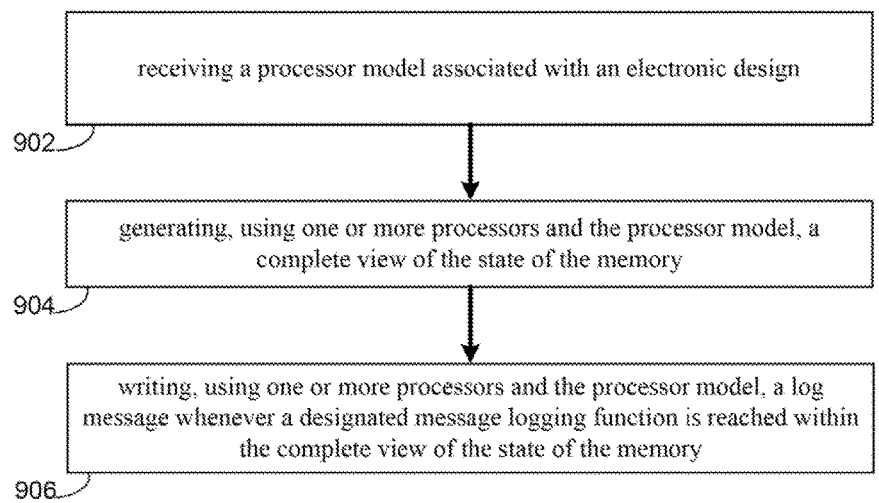
FIG. 9 is a flowchart illustrating operations according to an embodiment of the debugging process described herein.

Referring also to FIG. 9, a flowchart 900 depicting one embodiment consistent with the debugging process described herein is provided. The debugging process may include receiving 902 a processor model associated with an electronic design and generating 904, using one or more processors and the processor model, a complete view of the state of the memory. The debugging process may include writing 906, using one or more processors and the processor model, a log message whenever a designated message logging function is reached within the complete view of the state of the memory.

Embodiments of the debugging processes described herein may provide the ability to re-construct log messages as non-intrusively as possible in a post-simulation software debugging environment using an indication of the log message to generate (e.g. a function call signature/series of high-level programming language expressions) and a source file location instrumented in the embedded software at which to re-construct the log message and record it to a database. This may include an existing log function implementation (e.g. that writes to a UART or other output device), an empty logging function location inserted for only this purpose, and/or a "meta-comment" in the source code indicating where the log message should be reconstructed.

In some embodiments, the processes described herein may apply one or more algorithms, which may use a mechanism for evaluating processor register/memory information (e.g., using a processor trace as described above, or using standard debugging APIs to get register/memory information from a simulated processor). These may be used in conjunction with mechanisms for reading symbolic information from an embedded software image. This information may be combined to evaluate high level programming expressions which are interpreted as the logging function parameters.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for capturing log messages in a post-processing debugging environment comprising:
   receiving a processor model associated with an electronic design;
   generating, using one or more processors and the processor model, a complete view of the state of the memory;
   accessing symbolic software debugging information including at least one of Executable and Linkable Format (ELF) and Debugging With Attributed Record Formats (DWARF) compiler created files;
   accessing a program counter associated with a hardware state database;
   retrieving, using one or more processors without requiring a specialized processor configured to communicate with a Universal Asynchronous Receiver ("UART"), the processor model, the complete view of the state of the memory, the symbolic software debugging information, and the program counter, each time a designated logging function that is an empty logging function is reached within the complete view of the state of the memory, at least one parameter of a plurality of parameters of a function signature of the reached designated message logging function, wherein the parameters of the function signature include a severity of a message, a verbosity of the message, and a tag associating the message with a functional or behavioral category;
   writing, using one or more processors without requiring a specialized processor configured to communicate with a UART, a log message containing each retrieved at least one parameter.

2. The computer-implemented method of claim 1, wherein writing includes: determining a caller of the log message; recording message information at a source file location; and presenting the message information in a user interface of the post-processing debug environment.

3. The computer-implemented method of claim 2, further comprising: setting a breakpoint in the designated message logging function within the complete view of the state of the memory, wherein retrieving at least one parameter of the designated message logging function occurs when a breakpoint in a designated logging function is reached.

4. The computer-implemented method of claim 2, wherein the message information recorded at a source file location includes one or more of the at least one parameter of the designated message logging function and the caller of the log message.

5. The computer-implemented method of claim 2, wherein writing a log message includes yielding control of the processor model to the debugging environment.

6. The computer-implemented method of claim 1, wherein the designated logging function is written as a pseudo-comment associated with source code.

7. The computer-implemented method of claim 1, wherein the complete view of the state of memory is generated at each time point contained in a hardware state database.

8. A computer-readable storage medium having stored thereon instructions that when executed by a machine result in the following operations for capturing log messages in a post-processing debugging environment:
   receiving a processor model associated with an electronic design;
   generating, using one or more processors and the processor model, a complete view of the state of the memory;
   accessing symbolic software debugging information including at least one of Executable and Linkable Format (ELF) and Debugging With Attributed Record Formats (DWARF) compiler created files;
   accessing a program counter associated with a hardware state database;
   retrieving, using one or more processors without requiring a specialized processor configured to communicate with a Universal Asynchronous Receiver ("UART"), the processor model, the complete view of the state of the memory, the symbolic software debugging information, and the program counter, each time a designated logging function that is an empty logging function is reached within the complete view of the state of the memory, at least one parameter of a plurality of parameters of a function signature of the reached designated message logging function, wherein the parameters of the function signature include a severity of a message, a verbosity of the message, and a tag associating the message with a functional or behavioral category;
   writing, using one or more processors without requiring a specialized processor configured to communicate with a UART, a log message containing each retrieved at least one parameter.

9. The computer-readable storage medium of claim 8, wherein writing includes:
   determining a caller of the log message;
   recording message information at a source file location; and
   presenting the message information in a user interface of the post-processing debug environment.

10. The computer-readable storage medium of claim 9, further comprising:
    setting a breakpoint in the designated message logging function within the complete view of the state of the memory, wherein retrieving at least one parameter of the designated message logging function occurs when a breakpoint in a designated logging function is reached.

11. The computer-readable storage medium of claim 9, wherein the message information recorded at a source file location includes one or more of the at least one parameter of the designated message logging function and the caller of the log message.

12. The computer-readable storage medium of claim 9, wherein writing a log message includes yielding control of the processor model to the debugging environment.

13. The computer-readable storage medium of claim 8, wherein the designated logging function is written as a pseudo-comment associated with source code.

14. The computer-readable storage medium of claim 8, wherein the complete view of the state of memory is generated at each time point contained in a hardware state database.

15. A system for capturing log messages in a post-processing debugging environment comprising:
   at least one processor configured to receive a processor model associated with an electronic design;
   the at least one processor further configured to generate, based upon, at least in part, the processor model, a complete view of the state of the memory;
   the at least one processor further configured to access symbolic software debugging information including at least one of Executable and Linkable Format (ELF) and Debugging With Attributed Record Formats (DWARF) compiler created files;
   the at least one processor further configured to access a program counter associated with a hardware state database;
   the one or more processors further configured to, using the processor model, the complete view of the state of the memory, the symbolic software debugging information, and the program counter, retrieve, without requiring a specialized processor configured to communicate with a Universal Asynchronous Receiver ("UART"), each time a designated logging function that is an empty logging function is reached within the complete view of the state of the memory, at least one parameter of a plurality of parameters of a function signature of the reached designated message logging function, wherein the parameters of the function signature include a severity of a message, a verbosity of the message, and a tag associating the message with a functional or behavioral category;
   the one or more processors further configured to, using one or more processors without requiring a specialized processor configured to communicate with a UART, write a log message containing each retrieved at least one parameter.

16. The system of claim 15, wherein the at least one processor is further configured to, determine a caller of the log message, record message information at a source file location, and present the message information in a user interface of the post-processing debug environment.

* * * * *